United States Patent [19]

Ishida et al.

[11] 4,023,076

[45] May 10, 1977

[54] DISCHARGE GAP DEVICE

[75] Inventors: Yotsuo Ishida, Chofu; Hiroshi Kuwahara, Amagasaki, both of Japan

[73] Assignees: Mitsubishi Denki Kabushiki Kaisha; Tokyo Electric Power Co., Ltd., both of Japan

[22] Filed: Oct. 20, 1975

[21] Appl. No.: 624,235

[30] Foreign Application Priority Data

Nov. 20, 1974 Japan ............................ 49-133891

[52] U.S. Cl. ............................. 361/118; 317/12 R; 317/69; 361/129; 361/15

[51] Int. Cl.$^2$ ........................................... H02H 3/20

[58] Field of Search .................. 317/61.5, 12 R, 74, 317/73, 61, 69, 62, 68, 65, 63; 313/245, 247, 248, 157, 156, 216, 217, 301; 315/36, 60

[56] References Cited

UNITED STATES PATENTS

| | | | |
|---|---|---|---|
| 1,232,467 | 7/1917 | Peck Jr. | 317/61 |
| 1,477,305 | 12/1923 | Allcutt | 317/61 X |
| 2,473,850 | 6/1949 | Beck et al. | 317/68 |
| 2,907,910 | 10/1959 | Marsteller | 317/69 X |
| 3,328,632 | 6/1967 | Robinson | 317/62 X |
| 3,413,524 | 11/1968 | Train | 317/69 |

*Primary Examiner*—J. D. Miller
*Assistant Examiner*—Patrick R. Salce
*Attorney, Agent, or Firm*—Robert E. Burns; Emmanuel J. Lobato; Bruce L. Adams

[57] ABSTRACT

Two main toroidal electrodes are supported to individual support plates to oppose to each other. A rod-shaped consumable electrode disposed on one of the support plates loosely extends through the central opening of the toroidal electrode supported to the same support plate as the consumable electrode and terminates within the central opening of the other toroidal electrode. The consumable electrode opposes to a similar consumable electrode disposed on the other support plate. All the electrodes are higher in electric resistivity than the support plates and may be formed of carbon.

5 Claims, 5 Drawing Figures

DISCHARGE GAP DEVICE

BACKGROUND OF THE INVENTION

This invention relates generally to the series capacitor connected in electric power transmission systems and more particularly to an electric discharge gap device for protecting the series capacitor against an overvoltage thereacross.

Recently the demand of electric power is rapidly increased in urban areas including the districts around cities but locations of power production are far away from the urban area as a result of the reflex of the overpopulation in cities and the land situation. On the other hand, the production of electric power has the tendency to be effected on an increasingly large scale. Thus electric transmission systems connecting locations of power production to associated areas where the electric power is demanded becomes very long in line length. Also since the transmission capacity required will become high to an unprecedented extent, it is requested to efficiently and safely supply the stabilized electric power with a low loss upon future power transmission.

Further power transmission systems generally become unstable with increases in line constants such as the line resistance, line impedance etc. and also with an increase in transmission distance. This results in a gradual decrease in a quantity of possible transmission of electric power. As a result, the series capacitor has been highlighted for the purpose of increasing the transmission capacity, improving the stability of the transmitted voltage and so on during high capacity long distance transmission.

Upon the occurrence of a fault in the system, an excessive current flows through this series capacitor to render a voltage thereacross extremely high. This leads to damage 7 the series capacitor accompanied by disabling of the power transmission. In order to protect the series capacitor against this increase in voltage, a protective gap device has been connected across the series capacitor. That protective gap device is required to rapidly protect the series capacitor against an overvoltage developed thereacross while, after the removal of the system fault, permitting the series capacitor to be rapidly re-connected in the system to accomplish to the proper purpose of the capacitor. In other words, the protective gap device preferably performs the accurate operation and has the ability to withstand a high discharge current from the capacitor while retaining the same protective capability as prior to the electric discharge even in the transient state where the series capacitor is again being connected in the system after the extinction of the particular electric arc across the gap device.

One of the conditions required for the protective gap device to fulfil the duties such as above described is to prevent discharge electrodes involved against damaging due to an arc current developed during an electric discharge as far as possible and to restrain a decrease in the discharge characteristic of the device. Also if a product of electric discharge is formed in a large amount then the discharge characteristic of the device is affected. This leads to the necessity of paying attention to prevent an electric arc from touching electrode support means, a housing surrounding electrodes, etc.

Conventional discharge gap devices commonly employed, have been designed and constructed such that the electric arc struck across the main electrodes is transferred to consumable electrodes by means of the action of an electromagnetic force due to an arc current flowing through the electrodes whereby the electric arc is prevented from remaining on the surfaces of the main electrodes at one position. Thus the electric arc tends to spread toward the housing encircling the electrodes and thereby greatly affect the housing. This has resulted in the disadvantage that conventional discharge gap devices can not be constructed into enclosed structures extremely small-sized and compact.

SUMMARY OF THE INVENTION

Accordingly it is an object of the present invention to eliminate the disadvantage of the prior art practice as above described.

It is another object of the present invention to provide an electric discharge gap device including improved means for rapidly transferring an electric arc struck across a pair of main electrodes to a pair of consumable electrodes to minimize damage to the main electrodes and holding the transferred arc on the consumable electrodes.

The present invention accomplishes these objects by the provision of an electric discharge gap device comprising, in combination, a pair of electrode support plates disposed in opposite relationship, a pair of main electrodes in the form of toroids supported in spaced opposed relationship to the electrode support plates respectively, a pair of rod-shaped consumable electrodes supported by the electrode support plates and respectively disposed coaxially with the main electrodes and oppositely to each other, the main electrodes and the consumable electrodes being composed of an electrically conductive material higher in resistivity than an electrically conductive material forming the support plates, and means for transferring an electric arc struck across the main electrodes to the consumable electrodes by means of the action of an electromagnetic force due to an arc current flowing through the main electrodes.

Preferably, that consumable electrode supported by the same electrode support plate as one of the main electrodes may extend through the central opening of the toriod of the one main electrode to be spaced away from the latter and terminates within the central opening of the other toroid.

Advantageously, one of the main electrode and that consumable electrode supported to the same electrode support plate as the one main electrode may be constructed together into a disc including a central protrusion.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
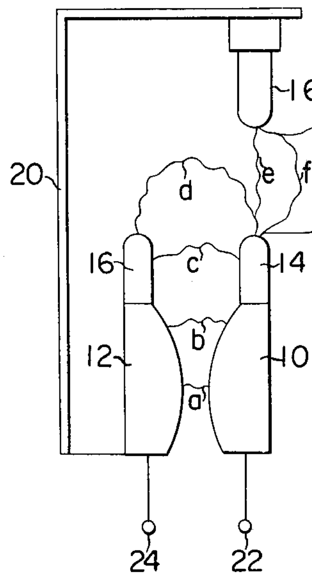
FIG. 1 PRIOR ART
FIGS. 1 and 2 are sectional views of conventional electric discharge gap devices additionally illustrating the behavior of electric arcs developed across the devices.

Referring now to the drawing and FIG. 1 in particular, it is seen that an arrangement disclosed herein comprises a pair of main electrodes 10 and 12 disposed in spaced opposite relationships and having respective convex surfaces facing each other to form an electric discharge gap having a spacing gradually increased from the center toward both ends. Then a pair of opposite consumable electrodes 14 and 16 are connected to one end, in this case, the upper ends as viewed in FIG. 1 of the main electrodes 10 and 12 respectively to form therebetween an electric discharge gap having a constant spacing greater than the spacing between the main electrodes 10 and 12. Another consumable electrode 16 is vertically aligned with the consumable electrode 14 to form an electric discharge gap therebetween and shown in FIG. 1 as being attached to an L-shaped electrode support plate 20 on which the main electrode 12 is also disposed.

Figure 2:
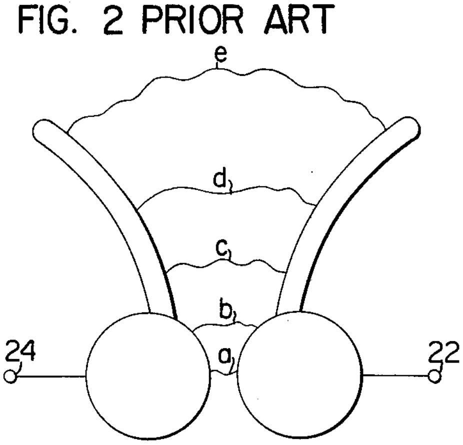
FIG. 2 PRIOR ART

FIG. 2 shows another conventional discharge gap device formed of a pair of main electrodes 10 and 12 in the form of spheres disposed oppositely to each other to form a discharge gap therebetween and a pair of elongated consumable electrodes 14 and 16 extending from the main electrodes 10 and 12 to run away from each other to form therebetween a discharge gap gradually increased in spacing toward the free ends. The main electrodes 10 and 12 are connected to terminals 22 and 24 respectively.

The arrangements as shown in FIGS. 1 and 2 have been designed and constructed such that an electric arc struck across the main electrodes 10 and 12 is prevented from remaining at one position by transferring the arc from the main electrodes 10 and 12 to the consumable electrodes 14 and 16 and in the arrangement of FIG. 1 then to the consumable electrodes 14 and 18 through the utilization of an electromagnetic force caused from an arc current electrodes.

In the arrangement of FIG. 1, an electric arc is struck across the main electrodes 10 and 12 through a minimum distance therebetween is successively moved between the main electrodes 10 and 12 toward one end in this case the upper ends thereof and then between the consumable electrodes 14 and 16 as shown at lines *a*, *b*, *c* and *d* in FIG. 1 to spread in the space. Thereafter the electric arc is transferred to the consumable electrodes 14 and 18 to spread in the space as shown at line *e*, *f* and *g*.

In the arrangement of FIG. 2, an electric arc is first struck across those portions of the main electrodes 10 and 12 having a minimum spacing therebetween as shown at line *a* in FIG. 2. Then the arc is successively moved between the electrodes as shown at lines *b*, *c*, *d* and *e* in FIG. 2 until it reaches the free ends of the consumable electrodes 14 and 16. In this way the electric arc increasingly spreads in the space.

The reasons for which the electric arc spreads in the space will now be described with reference to FIG. 3. As shown at the arrows in FIG. 3, a current from a point *m* flows through a current path including points 1, 2, 3, 4 and 5 to reach a point *n*. The points 1 and 4 designate current terminals and the electric arc exists between the points 2 and 3. When the current flows through those portions of the current path extending between the points 1 and 2 and between the points 3 and 4 that is, the interior of both electrodes establishes magnetic fields adjacent the arc portion 2–3 in the directions as shown by the symbols "dot in circle" and "cross in circle". Each of the magnetic fields thus established exerts an electromagnetic force F on the electric arc in the direction of the arrow shown in FIG. 3. This causes the arc to spread in the space as above described. This greatly affects the housing surrounding discharge gaps or the like resulting in the disadvantage that conventional protective gap devices can not be constructed into small-sized, compact and enclosed structures.

Figure 3:
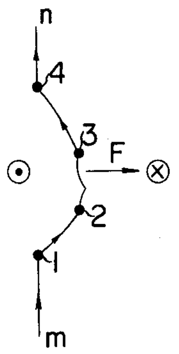
FIG. 3 is a diagram useful in explaining an electromagnetic force exerted on an electric arc.

The present invention contemplates elimination of this disadvantage of the prior art practice and provides a protective gap device minimized in damage to surfaces of a pair of main electrodes across which an electric arc is struck, by rapidly moving the arc from the main electrodes to a pair of consumable electrodes as above described in conjunction with FIG. 3. Then the transferred arc remains and is held on the consumable electrodes.

Figure 4:
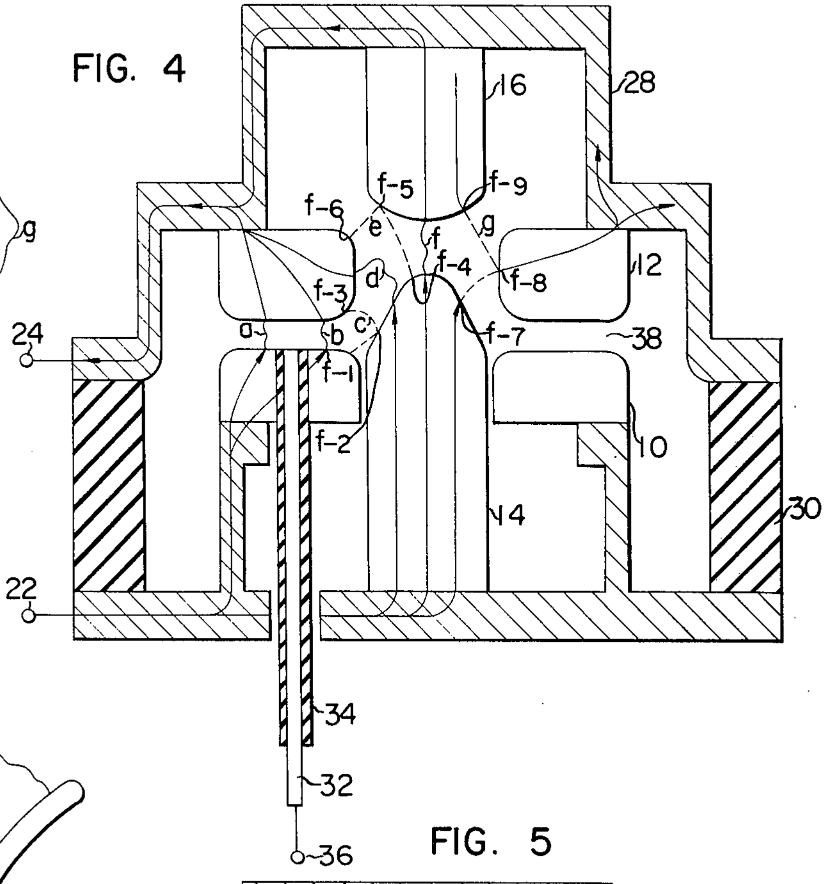
FIG. 4 is a sectional view of an electric discharge gap device constructed in accordance with the principles of the present invention and utilizing the electromagnetic force shown in FIG. 3.

FIG. 4 shows a protective discharge gap device constructed in accordance with the principles of the present invention. The arrangement illustrated comprises a pair of main electrodes 10 and 12 in the form of hollow toroids disposed in vertically spaced opposed relationship to form an annular discharge gap therebetween and a rod-shaped consumable electrode 14 extending through the central opening of the toroid of on the main or lower electrode 10 to form a narrow annular clearance therebetween. The consumable electrode 14 has a round pointed end terminating within the central opening of the upper toroid 12 to form an electric discharge gap therebetween and facing a round end of another rod-shaped consumable electrode 16 vertically aligned with the same to form an electric discharge gap therebetween.

The consumable electrode 14 is fixedly secured to a lower electrode support plate 26 of any suitable electrically conductive material in the form of a disc and the main upper electrode 10 is attached to an upper flanged end of a hollow cylinder vertically erected on the plate 26. Similarily the upper consumable electrode 16 extends downwardly from a top of an upper electrode support plate disc 28 in the form of a stepped bell formed of the same material as the lower plate 26 and the main upper electrode 12 is attached to an inner surface of an intermediate annular step on the bell 28. The upper and lower supporting discs 28 and 26 respectively face each other with an electrically insulating annulus 30 interposed therebetween to maintain predetermined spacings between the main electrodes 10 and 12 and between the consumable electrodes 14 and 16. Thus the main electrode 10 and the consumable electrode 14 are equal in electric potential to each other as are the main electrode 12 and the consumable electrode 16.

The arrangement further comprises a trigger electrode 32 snugly fitted into an electrically insulating sleeve 34 and loosely extending through the lower disc 26. The trigger electrode 32 has one end portion tightly embraced by the main lower electrode 10 through the insulating sleeve 34 with the end face thereof substantially flush with that surface of the main electrode 10 opposed to the main electrode 12. The trigger electrode 32 is electrically connected at the other end to a trigger terminal 36. Upon a voltage across an associated series capacitor (not shown) exceeding a predetermined protective level, the trigger electrode 32 is adapted to receive an external signal to forcedly initiate an electric discharge across the main electrodes 10 and 12. The upper and lower support disc 28 and 26 respectively are electrically connected to electrode terminals 24 and 22 respectively.

All the electrodes should be composed of any suitable electrically conductive material higher in resistivity than an electrically conductive material forming the electrode support discs 26 and 28 for the purpose as will be apparent hereinafter. The electrodes are preferably composed of carbon.

With a voltage applied across the main electrodes 10 and 12, a trigger voltage is applied to the trigger electrode 32 through the trigger terminal 36. This strikes an electric arc across the main electrodes 10 and 12 adjacent to the exposed end of the trigger electrode 32 whereby the electric arc bridges that portion of the discharge gap (which is labelled 38 in FIG. 4) adjacent to the trigger electrode 32 between the main electrodes 10 and 12.

Under these circumstances, a current flows from the electrode terminal 22 through the lower support disc 26, the main lower electrode 10, the electric arc, the main upper electrode 12 and the upper support disc 28 and thence to the electrode terminal 24 as shown at the arrow in FIG. 4. The current flowing through the main electrodes 10 and 12 exerts an electromagnetic force such as shown in FIG. 3 upon the electric arc after it has bridged the gap along line a (see FIG. 4). This causes the electric arc to be successively moved from line *a*, through line *b* to line *c*, and so on.

When the electric arc across the main electrodes 10 and 12 reaches line c, that is to say, when the arc being driven with the electromagnetic force partly touches the lower consumable electrode 14, the same has three feet *f*-1, *f*-2 and *f*-3 formed on the main lower electrode 10, the lower consumable electrode 14 and the main upper electrode 12 respectively. Since the electromagnetic force continues to drive the electric arc and since the main electrode 10 is at the same potential as the consumable electrode 14, the arc spread along line *c* is transferred to an electric arc spread along line *d* between the lower consumable and main upper electrodes 14 and 12 respectively. In other words, the arc is transferred to bridge these electrodes 14 and 12.

Thereafter the electric arc continues to be moved by means of the action of the electromagnetic force until it reaches line *e*. That is, one portion of the arc touches the upper consumable electrode 16 to have three feet *f*-4, *f*-5 and *f*-6 formed on the electrodes 14, 16 and 12 respectively. In that event, the arc has the foot *f*-6 on the main upper electrode 12 tranferred to its foot *f*-5 on the upper consumable electrode 16 equal in potential to the main upper electrode 12 for the same reason as above described in conjunction with arc line *c*. This results in the electric arc being transferred from line *e* to line *f* extending between both consumable electrodes 14 and 16.

After the electric arc has been transferred to spread between both consumable electrode 14 and 16, the associated arc current is caused to flow substantially in a beeline through the rod-shaped consumable electrodes 14 and 16. Thus the electromagnetic force as shown in FIG. 3 scarcely affect the electric arc spread along the line *f*. As a result, the electric arc remains located between the consumable electrodes to be held thereon.

The electric arc established between the consumable electrodes 14 and 16 may tend to be irregularly moved to protrude out of region defined by the consumable electrodes 14 and 16 for any reason. In that event, the arc may again touch the righthand portion as viewed in FIG. 4 of the main upper electrode 12 to form three feet *f*-7, *f*-8 and *f*-9 on the electrodes 14, 12 and 16 respectively as shown at line *g* in FIG. 4. Under these circumstances, a portion of the arc current flows through the main upper electrode 12. The resulting current path is formed within the main electrode 12 so that it presents a minimum resistance to the current portion. Thus the current portion flows obliquely through the main electrode 12 to generate an electromagnetic force effective for returning the transferred arc from line *g* to line *f*. The effectiveness of this electromagnetic force results from all the electrodes being formed of an electrically conductive material higher in resistivity than the electrically conductive material forming the electrode support discs 26 and 28. For example, with the arc foot *f*-8 formed on the main electrode 12, the total current flowing to the electrode terminal 23 includes a portion flowing through the main electrode 12 along a straight line passing through the arc foot *f*-8 and the contact of the main electrode 12 with the support disc 28 and having a minimum distance therebetween. An electromagnetic force due to that portion of the current effectively operates to transfer the electric arc back to the consumable electrode 16. This is true in the case of the arc touching the lefthand portion of the main upper electrode 12. In other words, even though the electric arc after having been transferred to spread across the consumable electrodes may tend to protrude toward the inner periphery of the main electrode 12, the same is always applied with an electromagnetic force tending to direct it toward the center with the result that the electric arc is always held on the consumable electrodes and confined thereto.

Discharge gap devices such as shown in FIG. 4 were manufactured for trial and the behavior of the electric arcs occurring in such devices were photographed by a high speed camera. The line *a* through *g* as shown in FIG. 4 describing the behavior of the electric arc have resulted from the photographs thus obtained. By observing those photographs, it has been confirmed that the electric arc struck at the extremity of the trigger electrode 32 was transferred to the consumable electrodes at a very high speed such as 100 meters per second with an arc current of 50 kiloamperes after which the arc was confined to the central portions of the surfaces of the consumable electrodes by means of the action of an electromagnetic force involved. Also after the experiments, the surface of each main electrode was scarcely damaged. In addition, from the results ofthe experiments it has been seen that the higher the arc current the higher the electromagnetic force which is applied to the electric arc resulting in an increase in the speed of transfer of the electric arc. Thus it has been found that the present invention has provided a discharge gap device having a structure particularly suitable for high current purposes.

Figure 5:
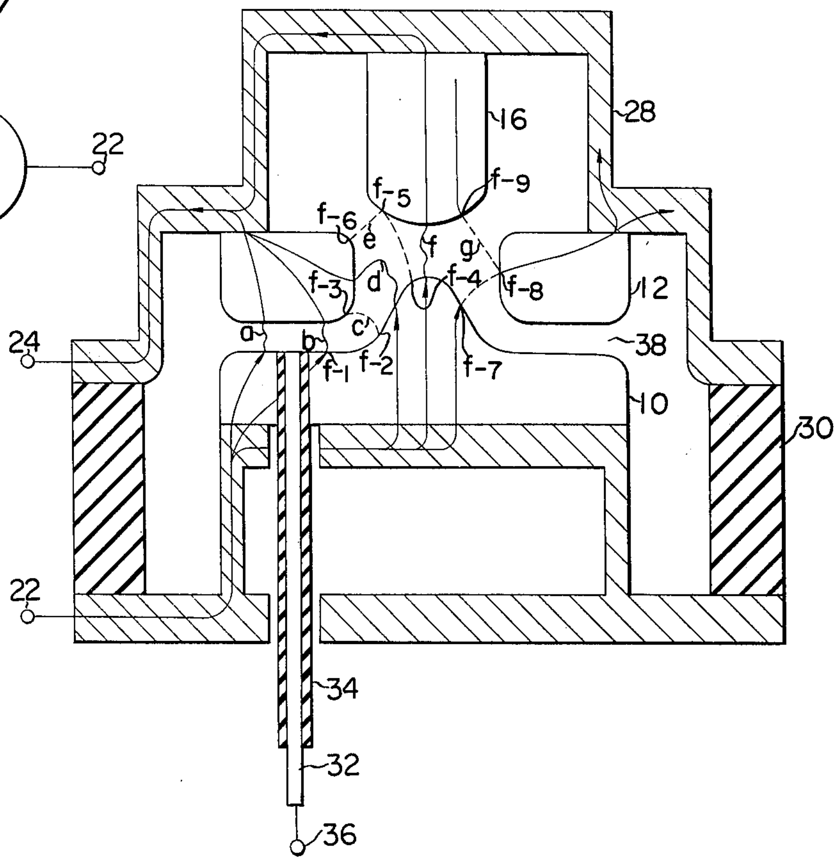
FIG. 5 is a sectional view of a modification of the present invention.

FIG. 5 shows a modification of the present invention wherein the main lower electrode is physically integral with the lower consumable electrode. In FIG. 5 wherein like reference numerals designate the components indentical to those shown in FIG. 4, the main lower electrode 10' is in the form of a hollow disc having a central round protrusion extending into the central opening of the upper toroid 12. The central round protrusion forms the lower consumable electrode 14. In other respects, the arrangement is identical to that shown in FIG. 4.

In the arrangement of FIG. 5, the pair of consumable electrodes can not be replaced by a new pair but there is the advantage that the lower main and consumable electrodes 10 and 14 respectively can be machined into a unitary structure. Where the discharge gap device is used in very low frequency operations, as in the protection of a series capacitor having a high capacitance, the arrangement of FIG. 5 can be more advantageously used than the arrangement as shown in FIG. 4. This is because each consumable electrode is extremely small in a consumed amount even during long service eliminating the necessity of replacing the consumed elecrodes by a new consumable electrodes and also because the machining and mounting of the electrode is facilitated in the arrangement of FIG. 5.

From the foregoing it will be appreciated that the present invention has provided a discharge gap device including a pair of main electrodes having surfaces which exhibit extremely little damage and are stable in discharge characteristics and therefore distinctively improved in reliability. This is because a high current arc which cannot be handled with conventional gap devices can be rapidly transferred from the main electrodes to consumable electrodes operatively associated therewith after which the arc is held on and confined to the consumable electrodes. Also the electric arc less affects a housing surrounding the same so that the discharge gap device has been possible to be disposed in a enclosed, compact and small-sized container. Thus when the present device is used as a protective gap for high currents, for example, as a protective device for a series capacitor high in capacitance, the same can be very simply connected to associated equipments thereby to greater contribute to a decrease in the overall dimension of the protective device.

While the present invention has been illustrated and described in conjunction with a few preferred embodiments thereof it is to be understood that numerous changes and modifications may be resorted to without departing from the spirit and scope of the present invention. For example, the trigger electrode 32 may be operatively associated with the main upper electrode rather than with the main lower electrodes. The arrangement as shown in either of FIGS. 4 and 5 may be operated while it is laid at its side or while it is upside down with the satisfactory result. Further, if it is required to keep a high current arc between the consumable electrodes for a long time, time either one of the upper and lower consumable electrodes may be in the form of a hollow cylinder in order to prevent the enclosed container from increasing in pressure due to an electric arc established therein by escaping the particular gas increased in pressure to the exterior of the container.

What we claim is:

1. An electric discharge gap device comprising, in combination: a pair of conductive electrode support plates disposed in an opposed relationship; a pair of main electrodes in the form of toroids supported in a spaced opposed relationship on respective ones of said electrode support plates to define an arc gap therebetween; a pair of rod-shaped consumable electrodes supported on respective ones of said electrode support plates and disposed coaxially with said main electrodes and oppositely to each other, said main electrodes and said consumable electrodes being composed of an electrically conductive material higher in resistivity than the electrically conductive material forming said electrode support plates; and means for transferring an electric arc struck across said main electrodes to said consumable electrodes by an electromagnetic force developed by an arc current flowing through said main electrodes.

2. An electric discharge gap device as claimed in claim 1 wherein said main and consumable electrodes are formed of carbon.

3. An electric discharge gap device as claimed in claim 1 wherein that consumable electrode supported to the same support plate as one of said main electrodes extends through the central opening of the toroid of said one main electrode to be spaced away from the latter and terminates within the central opening of the other toroid.

4. An electric discharge gap device comprising, in combination: a pair of first and second conductive electrode support plates disposed in an opposed relationship; a first main electrode in the form of a toroid supported on said first electrode support plate; a first consumable electrode supported on said first electrode support plate and opposite the central opening of the toroid; a second main electrode in the form of a disc supported on said second electrode suport plate and opposite said first main electrode to define an arc gap therebetween, said second main electrode including a central protrusion extending into said central opening of said first main electrode to form a second consumable electrode, said main electrodes and said consumable electrodes being composed of an electrically conductive material higher in resistivity than the electrically conductive material forming said electrode mounting plates; and means for transferring an electric arc struck across said main electrodes to said consumable electrodes by an electromagnetic force.

5. An electric discharge gap device as claimed in claim 4 wherein said main electrodes and said consumable electrodes are formed of carbon.

* * * * *